United States Patent [19]

van Acker et al.

[11] 4,062,908

[45] Dec. 13, 1977

[54] PROCESS FOR BULK COPOLYMERIZATION OF VINYL ESTERS

[75] Inventors: Eduard M. A. A. J. van Acker; Geert J. M. Bijl, both of Delft, Netherlands

[73] Assignee: Shell Oil Company, Houston, Tex.

[21] Appl. No.: 675,679

[22] Filed: Apr. 9, 1976

[30] Foreign Application Priority Data

Apr. 9, 1975 United Kingdom ............... 14574/75

[51] Int. Cl.$^2$ ......................... C08F 2/02; C08F 255/10
[52] U.S. Cl. .................................. 260/885; 260/886; 260/896; 526/87

[58] Field of Search ....................... 260/885, 886, 896; 526/87

[56] References Cited

U.S. PATENT DOCUMENTS 3,956,245    5/1976    Van Steenis et al. ........... 260/878 R Primary Examiner—John Kight, III

[57] ABSTRACT

The preparation of vinyl ester copolymers is described. More particularly, a free-radical induced bulk copolymerization of ethylenically unsaturated compounds is described. The use of the resulting copolymers for coating applications, particularly in non-aqueous dispersions, is also described.

5 Claims, No Drawings

PROCESS FOR BULK COPOLYMERIZATION OF VINYL ESTERS

BACKGROUND OF THE INVENTION

The present invention provides an improved process over the process described in U.S. Pat. application Ser. No. 463,329, filed Apr. 23, 1974 now U.S. Pat. No. 3,956,245, issued May 11, 1976, directed to the preparation of random copolymers by the free-radical bulk polymerization of vinyl esters and vinyl aromatic compounds such as styrene. More particularly, the present process provides an improvement over the process described in U.S. Ser. No. 463,329, now U.S. Pat. No. 3,956,245 particularly with regard to the application of the resulting copolymers for coating purposes, especially in non-aqueous dispersions.

For the purpose of the present application, U.S. Pat. application Ser. No. 463,329, now U.S. Pat. No. 3,956,245, describes a process for the bulk copolymerization of certain monoethylenically unsaturated compounds denoted as (A), (B), (C), (D), (E), and (F) (all as hereinafter more particularly defined) in bulk at temperatures above 150° C in which gradual addition of component (B), a vinyl aromatic hydrocarbon such as styrene, is essential to control the rate of polymerization of the other components, in particular while component (A) is a vinyl ester of saturated monocarboxylic acids as hereinafter defined, and in which at least part of component (A), and optionally component (F), should be precharged.

Accordingly, insofar as the disclosure of U.S. Ser. No. 463,329 now U.S. Pat. No. 3,956,245 is relevant, such disclosure is incorporated herein by reference.

It has now been found that improved product performance can be obtained when from the polymerizable compounds only component (F) (as hereinafter defined) is precharged, and the other monomers are added at a reaction temperature above 150° C in two stages as defined hereinafter. For use as a binder in non-aqueous coating dispersions, for example, the new improved process enables a higher solids content at spraying viscosity, as a result of lower viscosity of the dispersions.

SUMMARY OF THE INVENTION

The present invention is directed to a free-radical induced bulk copolymerization process of selected monoethylenically unsaturated compounds.

Specifically, the invention is defined as a process for the preparation of copolymers of monoethylenically unsaturated compounds in the presence of a free-radical forming initiator by bulk copolymerization of A. 1-50 parts by weight of vinyl esters of saturated aliphatic monocarboxylic acids in which the carboxyl group is attached to a tertiary or quaternary carbon atom, and which carboxylic acids have at least 9 carbon atoms per molecule;
B. 1-60 parts by weight of a vinyl aromatic hydrocarbon;
C. 0-50 parts by weight of an ester, amide, and/or nitrile of an ethylenically unsaturated monocarboxylic acid having 3 to 4 carbon stoms per molecule;
D. 0-30 parts by weight of an ester of an ethylenically unsaturated dicarboxylic acid having 4-5 carbon atoms per molecule;
E. 0-20 parts by weight of an ethylenically unsaturated mono- or dicarboxylic acid, or anhydride thereof, having 3-5 carbon atoms per molecule, and
F. 1-20 parts by weight of a monoethylenically unsaturated polymeric hydrocarbon having a molecular weight higher than 1000;

the total amount of ethylenically unsaturated monomers being 100 parts by weight, which process is characterized in that a reactor charge containing component (F) and, optionally part of the initiator, is heated to at least 150° C, whereupon the other monoethylenically unsaturated components and initiator are gradually added during a period of from about 3 to 24 hours at a reaction temperature between 150° C and 200° C in one or more stages.

Component (A) as defined above is preferably derived from monocarboxylic acids having 5 to 22, preferably from 9 to 17 and more preferably 9 to 11, in particular 10, carbon atoms per molecule.

For convenience such carboxylic acids will hereinafter be referred to as "branched monocarboxylic acids", and the vinyl esters as "vinyl esters of branched monocarboxylic acids". "Aliphatic" in this connection will include acyclic aliphatic as well as cycloaliphatic.

The branched monocarboxylic acids can be obtained by reacting formic acid or carbon monoxide and water with olefins in the presence of liquid strongly acidic catalysts; the olefins may be products obtained by cracking paraffinic hydrocarbons, such as mineral oil fractions, and these olefins may contain branched as well as straight-chain acyclic and/or cycloaliphatic olefins. Reaction of such olefins with formic acid, or carbon monoxide and water, produces a mixture of carboxylic acids in which the carboxyl group is predominantly attached to a quaternary carbon atom. Other olefinic starting materials are, for example, propylene trimer, propylene tetramer, and diisobutylene.

Suitable branched monocarboxylic acids are the saturated monocarboxylic acids having the carboxyl groups attached to a tertiary and/or quaternary carbon atom and include the so-called alpha-branched saturated monocarboxylic acids of the general formula:

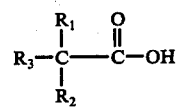

wherein $R_1$ and $R_2$ each represents the same or different alkyl radicals of normal, branched or cyclic structure and $R_3$ represents hydrogen or a hydrocarbyl radical. In the foregoing formula, $R_1$ and $R_2$ each may be a methyl, ethyl, propyl, butyl, pentyl, octyl, decyl, etc. radical. Hydrocarbyl radicals represented by $R_3$ comprise, for example, alkyl radicals of normal, branched or cyclic structure, including methyl, ethyl, propyl, butyl, pentyl, hexyl, octyl, as well as alkaryl, aralkyl and aryl radicals. Very suitable such branched monocarboxylic acids include the alpha, alpha-dialkyl monocarboxylic acids having from 5 to about 22 carbon atoms in the molecule. A preferred group comprises the acids possessing from about 9 to 19 carbon atoms with those acids having from 9 to 11 being especially preferred. A suitable method for their preparation is disclosed in U.S. Pat. Nos. 3,047,662, 3,059,005 and 3,059,006.

As saturated aliphatic branched monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art. Monocarboxylic acids branched at the alpha position can also be obtained according to Reppe's method. Of special value are the acids from monoolefins with 8 to 18 carbon atoms. Mixtures of olefins obtained by cracking paraffininc hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

These alpha-branched monocarboxylic acids may be converted to their respective vinyl esters by well-known techniques such as those described in U.S. Pat. Nos. 3,186,974, 3,287,300, 3,294,727 and British Pat. specification No. 933,470, as for example, by reacting the acids with acetylene.

Preferred are vinyl esters of such monocarboxylic acids which contain 9-11, in particular, on average 10, carbon atoms per molecule. The amount of component (A) may be 10-50, preferably 15-40, and more preferably 15-20, parts by weight.

Component (B), the vinyl aromatic hydrocarbon which is an essential component in the present process, is preferably a monovinyl aromatic hydrocarbon having 8-9 carbon atoms per molecule, such as styrene, vinyl toluene, or alpha-methyl styrene. The amount of component (B) is preferably 10-50, and more preferably 15-40, parts by weight.

Components (C), (D), and (E) are optional in the present process. One or more of them may be used for example for a specific application of the polymer.

Component (C) comprises esters, amides, and nitriles derived from the branched monocarboxylic acids defined above. Suitable nitriles are acrylonitrile and methacrylonitrile; suitable amides are acrylamide, methacrylamide, and hydroxy- or alkoxy-methylated derivatives, wherein the alkyl group has from 1 to 18, preferably from 1 to 4, carbon atoms. Suitable esters are esters of acrylic, methacrylic and crotonic acid in a 1:1 molar ratio acid:alcohol with monohydric or polyhydric alcohols having 1-20 carbon atoms per molecule, such as methanol, ethanol, butanol, 2-ethyl hexanol, aluryl alcohol, octadecanol, ethylene glycol, propylene glycol, glycidol. Mixtures of esters can be used; esters of acrylic acid can be used in amounts up to 25 parts by weight, and mixtures of esters of acrylic and methacrylic acid in amounts up to 50 parts by weight. Preferred amounts of component (C) are from 5 to 50 parts by weight.

Component (D) comprises esters of dicarboxylic acids with saturated monohydric alcohols having preferably 1-4 carbon atoms per molecule, such as dimethyl maleate, diethyl fumarate, dibutyl fumarate, diethyl itaconate. Preferred amounts of component (D) are from 0 to 20 parts by weight.

Component (E) comprises ethylenically unsaturated mono- and di-carboxylic acids, and anhydrides and mono-esters thereof, having 3-5 carbon atoms per molecule, as exemplified by acrylic acid, methacrylic acid, crotonic acid, itaconic acid, maleic acid, maleic anhydride, fumaric acid, and monomethyl maleate; preferred amounts are from 1 to 10 parts by weight.

Component (F) is preferably a polyisobutylene having a molecular weight (number average, indicated as $\overline{M}_n$) of from 2,000 to 15,000, more preferably of from 2,000 to 11,000; particularly preferred materials are commercial polyisobutylenes known as "Oppanol" B 10, having $\overline{M}_n$ of about 8,000, and "Hyvis" 2,000 having $\overline{M}_n$ of about 5,800. Other preferred materials are commercial polyisobutylenes known as "Napvis" D 200 and "Polyvis" 200 ($\overline{M}_n$ = 2,000 – 3,000). ("Oppanol", "Hyvis", "Napvis" and "Polyvis" are registered trademarks.) Preferred amounts of component (F) for the preparation of polymers for non-aqueous dispersions are from 4 to 10 parts by weight.

With a reaction temperature above 150° C it is preferred to use one or more initiators having a half lifetime of at least 0.4 hours at 150° C, and preferably from 0.6 to 1.5, more preferably from 0.6 to 1.1, hour at 150° C; such initiators are particularly preferred if the main polymerization reaction is performed between 155° and 170° C, for example at 160° C. Initiators of this type are usually organic peroxides. The half lifetime is the time required to reduce by 50% the active oxygen content of a diluted solution of peroxide at the temperature indicated; for determining half lifetimes at 150° C the solvent is monochloro benzene. Suitable initiators in the present process include, for example, 2,2-di-tert. butyl peroxybutane, dicumyl peroxide, tert. butyl comyl peroxide, 1,3-bis (tert.butyl peroxyisopropyl) benzene, di-tert.butyl peroxide, di-isopropyl benzene monohydroperoxide, cumene hydroperoxide, tert.butyl hydroperoxide, and mixtures thereof. However, free-radical initiators of other types or other half lifetimes can also be used, such as azobis(isobutyronitrile). A very preferred initiator is di-tert.butyl peroxide.

Molecular weight regulators may also be used. Suitable regulators include the mercapto compounds, such as dodecyl mercaptan, mercaptoacetic acid and mercapto ethanol; they are preferably added with the gradual addition of monomers.

The polymerization is preferably performed in an oxygen-free atmosphere, for example, under nitrogen, and the reactor is preferably equipped with adequate means for stirring, heating, and cooling, and also with a reflux condenser to retain volatile components, such as styrene.

The polymerization can be performed at atmospheric pressure, but lower or higher pressure may be advisable in some cases, as, for example, to facilitate removal of an undesired solvent of the initiator or of another component. Volatile components (B), (C), (D) or (E) when present in small amounts during the polymerization can be retained easily by an adequate refluxing unit.

At polymerization temperature the copolymer is a liquid which can be stirred easily. After the polymerization, the reactor content can be dissolved or dispersed as required, or dumped and cooled; the cooled product solidifies easily to a homogeneous solid mass; if desired, the solid product may be ground and sieved with conventional means to a desired particle size.

The polymerization between 150° C and 200° C may be performed in one stage if a relatively small amount, say up to 5 parts by weight, of component (A) is used, or, when larger amounts of component (A) are used, if a few parts by weight of free component (A) in the reaction product can be tolerated. It is preferred, however, to perform the polymerization above 150° C in two stages, the first stage comprising gradual addition of component (A), at least part of component (B), initiator, and optionally part of components (C), (D), and (E); the second stage comprising gradual addition of the remainder of component (B), initiator, and optionally the remainder of components (C), (D), and (E).

The weight ratio of components (A) and (B) during their combined gradual addition is preferably below 25:1, to make use of the retarding effect of this combination to control effectively the rate of polymerization at the relatively high polymerization temperatures used. It is convenient to add the mixture or mixtures of components and initiator at a constant or changing rate through a metering pump or other means by which each stage is subdivided in consecutive steps, each consisting of a shot of certain amounts of monomers and initiator followed by a digestion period. It is also possible, of course, to vary the composition of components in each stage stepwise or gradually.

It is convenient to mix components and initiator to be added in a certain stage, and to add the mixture to the reactor. It is also possible to add one or more components separately, for example components (B) can be added separately to be able to better control the polymerization by changing the rate of additions independently.

The amount of initiator is preferably 0.5–5%, more preferably 1–4% by weight of the total amount of monomers. Part of the initiator may be added to the original reactor charge, for example 1–10%, preferably 1–6%, of its weight, and another part may be added with the gradually added monomers, for example 1–5% of their weight. After all the monomers have been added to the reactor it is useful to add sequentially, e.g., three times, a further amount of 0.1 to 0.2 weight percent of initiator in 30 minute intervals to complete the polymerization. Alternatively, no initiator may be present in the original reactor charge, while initiator is added with the gradually added monomers.

The copolymers prepared can be used for a large variety of applications.

Copolymers containing from 3 to 10% by weight of residues of component (E) can be neutralized wholly or partly by alkaline compounds, preferably ammonia or organic amines, and then dissolved in water for use as lacquers or paint binders, for example, in electrodeposition paints. Copolymers containing acid groups may also be used as cross-linking components in epoxy resin compositions. Further, in copolymers containing hydroxy groups for cure with formaldehyde resins, the presence of carboxyl groups in the polymer will accelerate cross-linking and may improve properties of cured coatings.

Copolymers from components (A), (B), (C), and (F), in which at least part of (C) is a hydroxy-containing ester, an amide, or a methylolated derivative of an amide, and optionally (D) and/or (E) can be used as binders in thermosetting coating compositions, for example as binder component in powder coating compositions or solvent-based compositions (solutions or non-aqueous dispersons) with phenol-formaldehyde resins, amino-formaldehyde resins, such as urea-formaldehyde resins and melamine-formaldehyde resins (even if they have a low white-spirit tolerance), or with polyisocyanates or polyisothiocyanates as curing agents.

Copolymers from components (A), (B), (C), and (F), in which at least part of (C) is a glycidyl ester, and optionally (D), can be used as binders in thermosetting compositions, in combination with curing agents for polyepoxides, such as amines, polycarboxylic acids and/or polycarboxylic acid anhydrides, such as phthalic anhydride, hexahydrophthalic anhydride, succinic acid, azelaic acid, adipic acid, trimellitic anhydride, and acid-terminated polyesters produced by esterification of a diol or polyol with an excess of a dicarboxylic acid. For preparation of such polyesters useful diols and polyols are: ethylene glycol; 1,4 butane diol; 1,6 hexane diol; 1,4 cyclohexane diol; 2,2-bis(4-hydroxycyclohexyl)propane, trimethylolethane; pentaerythritol, and mixtures thereof, and as useful polycarboxylics can be mentioned succinic acid, adipic acid, azelaic acid, sebacic acid, decane 1,10 dicarboxylic acid, terephthalic acid and mixtures thereof. Copolymers having melting points above 70° C can be used as binders in coating powders for the preparation of thermoset coatings with excellent durability and U.V. resistance. For this purpose the copolymer can be blended with curing agent, if desired cocuring agents, curing accelerators, pigments, fillers, antisagging agents, and flow control agents; these can be mixed by dry blending (e.g. in a ball mill) or by fusion blending (e.g. in a Z-blade mixer, on hot rolls or in an extruder, or by combinations of such techniques). The cooled solid mix can then be ground (for example, in a pin disc mill) and sieved to obtain a powder of the desired particle size, as, for example, passing 45 mesh ASTM for use in a fluidized bed equipment, between 200 mesh and 45 mesh ASTM for use in an electrostatic fluidized bed, or less than 200 mesh ASTM for electrostatic spraying. Useful curing agents in powder compositions are polycarboxylic acids and acid-terminated polyesters as mentioned above. Useful curing accelerators can be found in the classes of compounds known to accelerate epoxy-carboxylic acid reactions, such as stannous octoate, tertiary phosphines, and quaternary phosphonium salts, quaternary ammonium salts, lithium salts, preferably lithium benzoate, and tertiary amines such as benzyl dimethyl amine, imidazole and benzimidazole such as imidazole, methyl imidazole, ethyl imidazole, etc., compounds and adducts thereof with epoxides.

Copolymers from components (A), (B), (F), and optionally (C), (D), and (E), can be used as binders in aqueous emulsion compositions; an advantage is that the copolymer can be produced independently from the emulsification process.

Copolymers from components (A), (B), and (F), and optionally (C), (D), and (E), can be used as binders in non-aqueous dispersions for use in paint compositions. The copolymers can easily be dispersed in aliphatic hydrocarbons, for example by stirring a hot mixture of aliphatic hydrocarbon and liquid copolymer in a heated vessel, or by high-shear mixing a mixture of copolymer powder with the aliphatic hydrocarbon in which the heat generated by the shear raises the temperature to above the melting point of the copolymer.

In each of the fields of use outlined above, the usual additives may be added, such as pigments, fillers, plasticizers, flow-control additives, cut-back agents, such as coal tar, aliphatic oils, asphaltic bitumen or waxes.

The process according to the invention enables the production of clear, colorless solid resins. The fact that they are clear indicates that the product is mainly a true copolymer, as homopolymers of the vinyl esters concerned and polystyrene are incompatible, and when mixed above their melting points and cooled, provide an opaque resin mixture. Further evidence that a true copolymer is obtained is provided by the glass transition temperature of the product, i.e., it has in general one single glass transition temperature, but addition of polystyrene or of homopolymer of the vinyl ester concerned results in the appearance of a second glass transition temperature.

The invention is illustrated by some illustrative examples. Some of the examples provide a comparison with a process according to U.S. patent application Ser. No. 463,329, now U.S. Pat. No. 3,956,245. Parts and percentages therein are by weight, unless otherwise indicated. "pbw" is an abbreviation for "parts by weight". The vinyl ester used ("VeoVa" 10; "VeoVa" is a registered trademark) is a vinyl ester of a mixture of saturated monocarboxylic acids having 10 carbon atoms per molecule, and wherein the carboxyl groups are attached to a tertiary or quaternary carbon atom. "Initiator B" was di-tert.butyl peroxide (half lifetime at 150° C: 0.8 hour). The commercial product known as "Trigonox B" ("Trigonox" is a registered trademark) is an emulsifier.

The general scheme in the examples (unless otherwise indicated) was as follows:

A reactor provided with stirrer, thermometer, reflux condeser, nitrogen inlet tube, heating jacket, and connected to a metering pump was charged with components indicated as "reactor charge" and heated to 170° C. Then mixtures of further components were metered in gradually in the time schedule indicated, and subsequently, three times an amount of 0.2 pbw of initiator was added, with intervals of ½ hour, all while keeping the temperature at 170° C. For the preparation of non-aqueous dispersions a liquid aliphatic hydrocarbon (boiling range 140°–165° C, aromatic content nil) was added gradually to the hot copolymer in ½-1 hour with vigorous stirring (2000 rpm), and the resulting copolymer dispersion was cooled to ambient temperature with stirring.

Paints were made by mixing the resin dispersion with a dispersion of titanium dioxide pigment in a solution of a butylated melamine-formaldehyde resin ("Maprenal" MF 580) in a solvent mixture consisting of liquid aliphatic hydrocarbon (77.8 pbw), butyl "Oxitol" (16.7 pbw), and butyl "Oxitol" acetate (5.5 pbw); the pigment dispersion was obtained by ball milling; the copolymer/MF resin weight ratio was 70/30, and the pigment/binder weight ratio was 0.7/1.

The paints were adjusted to spraying viscosity (DIN cup 4; 17 inches), and applied on bonderized steel panels.

MIBK is methylisobutylketone.

EXAMPLE I

This example demonstrates improvement of a resin prepared according to the invention (resin B) over a resin prepared according to U.S. patent application Ser. No. 463,329 (resin A) with regard to viscosity of the dispersion in relation to solids content in a non-aqueous dispersion (Table 1-1) and the evaluation results (Table 1-2), in which B demonstrates a better solvent resistance.

TABLE 1-1

|  | Unit | Resin A | Resin B | |
|---|---|---|---|---|
| Reactor charge |  |  |  |  |
| "VeoVa" 10 | pbw | 220 | — |  |
| Polyisobutylene (B 10) | " | 75 | 75 |  |
| Initiator B | " | 3.35 | 3.35 |  |
|  |  |  | 1st stage | 2nd stage |
| Addition time at 170° C | h | 5 | 3¾ | 1¼ |
| "VeoVa" 10 | pbw | — | 220 | — |
| Styrene | " | 260 | 173 | 87 |
| Methyl methacrylate | " | 110 | 73 | 37 |
| Hydroxy ethyl methacrylate | " | 170 | 113 | 57 |
| Butylacrylate | " | 160 | 107 | 53 |
| Methacrylic acid | " | 60 | 40 | 20 |
| Dimethylmaleate | " | 20 | 13 | 7 |
| Initiator B | " | 16.65 | 12.65 | 4 |
| Post reaction time | h | 1¼ | 1¼ |  |
| Initiator B | pbw | 3 × 3 | 3 × 2 |  |
| solids content dispersion | wt-% | 37.7 | 52 |  |
| viscosity dispersion | cP (25° C) | 2400 | 60 |  |
| stability | 3 months | good | good |  |

TABLE 1-2

|  | Unit | Resin A | Resin B |
|---|---|---|---|
| Solids content (pigmented) | % | 28.6 | 45 |
| Stoving schedule |  | 20' – 130° C | 20' – 130° C |
| Film thickness | μ | 50 | 66 |
| Konig hardness | s | 147 | 145 |
| Gloss | % | 96 | 89 |
| Erichsen slow penetration | mm | 3.7 | 2.0 |
| Ford impact | cm kg | 10 | 8 |
| Adhesion (Gitterschnitt) |  | 1 | 1 |
| Xylene resistance | min. | 1 | 30 |
| MIBK resistance | min. | 1 | >30 |

EXAMPLE II

This example describes the preparation of a resin copolymer and its evaluation as a binder in non-aqueous dispersions. The components are as in Example 1, the main difference is the reduced amount of methacrylic acid employed.

| The reactor is charged with: | Polyisobutylene B 10 | 7.5 pbw |
|---|---|---|
|  | Initiator B | 0.3 pbw |
| The reactor is then heated to 170° C, then monomer mixtures are added as follows: |  |  |
| 1st stage: | "VeoVa" 10 | 22.0 pbw |
| (3¾ hours at 170° C) | Methylmethacrylate (MMA) | 8.7 pbw |
|  | Styrene | 17.3 pbw |
|  | Hydroxyethylmethacrylate (HEMA) | 11.3 pbw |
|  | Butylacrylate | 10.7 pbw |
|  | Methacrylic acid | 1.4 pbw |
|  | Dimethylmaleate (DMM) | 1.3 pbw |
|  | Initiator B | 1.265 pbw |
| 2nd stage: | MMA | 4.3 pbw |
| (1¼ hours at 170° C) | Styrene | 8.7 pbw |
|  | HEMA | 5.7 pbw |
|  | Butylacrylate | 5.3 pbw |
|  | Methacrylic acid | 0.6 pbw |
|  | DMM | 0.7 pbw |
|  | Initiator B | 0.4 pbw |

During 2 hours post reaction, 3 times 0.2 pbw initiator is added at half-hourly intervals.

The results of a pigmented non-aqueous dispersion paint were as denoted in Table 2.

TABLE 2

| Stoving | 20 min. – 130° C |
|---|---|
| Thickness, μ | 44 |
| Hardness (Konig), sec. | 168 |
| Gloss (Lange 45°), % | 95 |
| Slow penetration (Erichsen), mm | 3.2 |
| Impact, direct (Ford), cm kg | 17 |

TABLE 2-continued

| Stoving | 20 min. – 130° C |
| --- | --- |
| MIBK resistance, min. | 12 |
| Xylene resistance, min. | 8 |
| Adhesion (Gitterschnitt) | 1 |

EXAMPLE III

Example II was essentially repeated with the exception that polyisobutylene B 10 was replaced by an equal amount of another polyisobutylene ("Hyvis" 2000, $M_n$ 5800). Similar results were obtained.

EXAMPLE IV

Example II was essentially repeated, with the exception that amounts and addition time of the two stages were:

| 1st stage:<br>(4 hours at 170° C) | "VeoVa" 10<br>MMA<br>Styrene<br>HEMA<br>Butylacrylate<br>Methacrylic acid<br>DMM<br>Initiator B | 22.0 pbw<br>9.75 pbw<br>19.5 pbw<br>12.75 pbw<br>12 pbw<br>1.5 pbw<br>1.5 pbw<br>1.3 pbw |
| --- | --- | --- |
| 2nd stage:<br>(1 hour at 170° C) | MMA<br>Styrene<br>HEMA<br>Butylacrylate<br>Methacrylic acid<br>DMM<br>Initiator B | 3.25 pbw<br>6.25 pbw<br>4.25 pbw<br>4 pbw<br>0.5 pbw<br>0.5 pbw<br>0.4 pbw |

Note: Similar results were obtained.

EXAMPLE V

Example I (resin B) was essentially repeated, with the exception that the hydroxyethyl methacrylate (HEMA) was replaced by the same amount of 2-hydroxy propyl methacrylate. The stability of the resin dispersions was good.

EXAMPLE VI

Example II was essentially repeated, with the exception that the butyl acrylate was replaced by an equal amount of ethyl acrylate. Similar results were obtained.

What we claim is:

1. In a process for the preparation of copolymers of monoethylenically unsaturated compounds in the presence of a free-radical forming initiator by bulk copolymerization of
    A. 1–50 parts by weight of vinyl esters of alpha-branched saturated aliphatic monocarboxylic acids having from 5 to 22 carbon atoms per acid molecule;
    B. 1–60 parts by weight of a vinyl aromatic hydrocarbon;
    C. 0–50 parts by weight of an ester, amide, and/or nitrile of an ethylenically unsaturated monocarboxylic acid having 3 to 4 carbon atoms per molecule;
    D. 0–30 parts by weight of an ester of an ethylenically unsaturated dicarboxylic acid having 4–5 carbon atoms per molecule:
    E. 0–20 parts by weight of an ethylenically unsaturated mono-or dicarboxylic acid, or anhydride thereof, having 3 to 5 carbon atoms per molecule, and
    F. 1–20 parts by weight of a polyisobutylene having a molecular weight; of from 2,000 to 15,000 the total amount of ethylenically unsaturated monomers being 100 parts by weight, the improvement which comprises first adding component (F) and optionally a part of the initiator, to the reactor and heating to at least 150° C and then gradually adding the other monethylenically unsaturated components and remaining initiator during a period from about 3 to about 24 hours at a reaction temperature between 150° C and 200° C in two stages, the first stage comprising gradual addition of component (A), at least part of component (B), initiator, and optionally part of components (C), (D), and (E), the second stage comprising gradual addition of the remainder of component (B), initiator, and optionally the remainder of components (C), (D), and (E).

2. The process of claim 1, wherein the weight ratio of components (A) and (B) during their combined gradual addition is below 25:1.

3. The process of claim 1, wherein component (A) is a vinyl ester of alpha-branched saturated aliphatic monocarboxylic acids having 9 to 11 carbon atoms per acid molecule.

4. The process of claim 1, wherein component (B) is a monovinyl aromatic hydrocarbon having 8–9 carbon atoms per molecule.

5. The process of claim 4 wherein component (B) is styrene.

* * * * *